(No Model.)

P. P. HILL.
BARBED FENCE WIRE.

No. 250,070. Patented Nov. 29, 1881.

Witnesses.

Inventor.
Peter P. Hill,
per. Gridley & Co.
his Attorneys.

UNITED STATES PATENT OFFICE.

PETER P. HILL, OF LEE STATION, ILLINOIS.

BARBED FENCE-WIRE.

SPECIFICATION forming part of Letters Patent No. 250,070, dated November 29, 1881.

Application filed October 7, 1881. (No model.)

*To all whom it may concern:*

Be it known that I, PETER P. HILL, of Lee Station, in the county of Lee and State of Illinois, have invented certain new and useful Improvements in Barbed Fence-Wires; and I do hereby declare that the following is a full, clear, and exact description thereof, which will enable others skilled in the art to which my invention appertains to make and use the same, reference being had to the accompanying drawings, and to the letters of reference marked thereon, forming a part of this specification.

Figure 1:
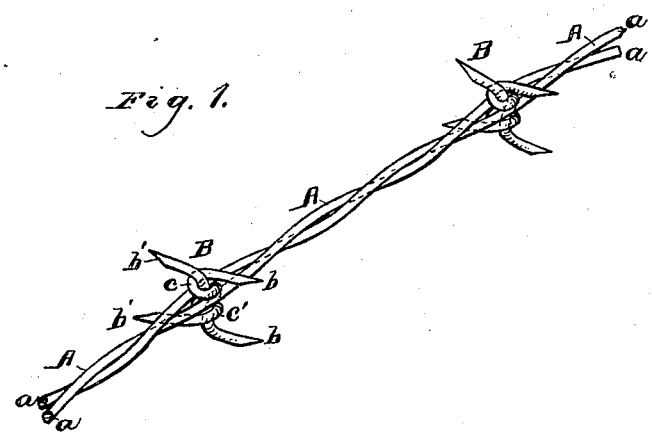
Figure 2:
Figure 3:
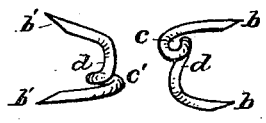

Figure 1 in the drawings is a perspective of a barbed fence-wire embodying my invention. Fig. 2 is a like representation of the barb detached, and Fig. 3 is a detail of the parts of the barb detached.

Like letters of reference indicate like parts.

A represents the fence-wire, and B B are the barbs. The fence-wire consists of two strands, $a\ a$, twisted together, as shown. Each barb consists of two pieces of wire, $b$ and $b'$, formed or bent substantially alike, and having sharpened or beveled ends or points, each piece being interlocked with the other, so that both together will constitute a four-pronged barb, substantially such as shown. To construct such a barb I take two pieces of wire, each of suitable length and size, and having sharpened ends. One of these pieces—$b$, for example—I bend around the other piece, $b'$, a little way from one end of each, thus forming in the piece $b$ an eye, $c$, through which the piece $b'$ passes. I then bend the piece $b'$ in like manner around the piece $b$, forming by that means in the piece $b'$ an eye, $c'$, through which the piece $b$ passes. The rims of these eyes perform the function of shoulders, as will hereinafter appear, and these shoulders are sufficiently apart from each other to receive a strand, $a$, between them. The ends of the wires $b$ and $b'$ are, of course, to be spread apart sufficiently to form oppositely-projecting prongs, as shown. The two barb-wires will thus be locked firmly together, so that any material alteration in the position of the prongs will be prevented. The two wires lie side by side between the shoulders $c$ and $c'$, so that a comparatively broad and flat neck, $d$, is thus formed to receive the strands of the fence-wire. In the example shown I have bent one wire up, over or across, and thence around the other, and the other down, across or under, and thence around its fellow, and the prongs of one wire extend in one direction from one of the broad sides of the seat $d$, and the prongs of the other in the opposite direction; but all these details of construction are not absolutely essential, as will hereinafter appear.

To apply the prongs to the fence-wire I place them at suitable distances apart between the strands $a\ a$ while the latter are being twisted together, the neck $d$ being arranged with its broad sides in contact with the said strands.

By this manner of making and applying the barbs they cannot turn or roll between the strands $a\ a;$ neither can they slip either longitudinally along or laterally across the wire A, the latter movement being prevented by the shoulders formed, as shown and described, at the ends of the neck $d$. It will be perceived, also, that the barbs cannot be turned around upon the wire A, and that the barbs do not encircle the wire A or any of its strands.

The barbs may be applied either by hand or by machinery, and the wire A may consist of two or more strands.

It will be perceived from the foregoing description and by reference to the drawings that the barbs contain a small amount of wire, that they may be constructed and applied with facility, and that they will be rigidly retained in their proper positions when applied, all of which it is my aim to accomplish by means substantially such as I have now described.

Having thus described my invention, what I claim as new is—

1. The four-pronged wire barb B, consisting of two wires, $b$ and $b'$, each bent around and interlocked with the other, substantially as described, and forming in the barb a central neck with a shoulder, and two prongs at each end thereof, for the purposes set forth.

2. The combination, with the wire A, consisting of two or more strands, $a\ a$, twisted together, of a series of barbs, B B, each consisting of two wires, $b$ and $b'$, bent around and interlocked with each other, substantially as described, and forming in the barb a central neck passing between the said strands, and a shoulder and two prongs on each side of the wire A, substantially as and for the purposes specified.

PETER P. HILL.

Witnesses:
N. COWLES,
HENRY FRANKFURTER.